(12) United States Patent
Lanigan, Sr. et al.

(10) Patent No.: US 9,126,811 B2
(45) Date of Patent: Sep. 8, 2015

(54) SYSTEM AND METHOD OF HANDLING CONTAINERS

(76) Inventors: John J. Lanigan, Sr., Orland Park, IL (US); John J. Lanigan, Jr., New Lenox, IL (US); Antonio Carlos Callado de Souza, Orland Park, IL (US); Myron Glickman, Arlington Heights, IL (US); Ken Svihlik, Orland Park, IL (US)

(*) Notice: Subject to any disclaimer, the term of this patent is extended or adjusted under 35 U.S.C. 154(b) by 607 days.

(21) Appl. No.: 13/237,485

(22) Filed: Sep. 20, 2011

(65) Prior Publication Data

US 2013/0071210 A1    Mar. 21, 2013

(51) Int. Cl.
*B65G 1/06* (2006.01)
*B65G 1/20* (2006.01)
*B66C 17/06* (2006.01)

(52) U.S. Cl.
CPC . *B66C 17/06* (2013.01); *B65G 1/06* (2013.01); *B65G 1/20* (2013.01)

(58) Field of Classification Search
CPC ............. B65G 1/00; B65G 1/02; B65G 1/06; B65G 1/10; B65G 1/12; B65G 1/20; B65G 67/00; B65G 6/02; B66C 17/06
USPC .................. 414/253, 259, 260, 264, 266–286
See application file for complete search history.

(56) References Cited

U.S. PATENT DOCUMENTS

| | | | | |
|---|---|---|---|---|
| 2,238,573 A * | 4/1941 | Steedman | ...... | 187/208 |
| 3,519,150 A * | 7/1970 | Keenan et al. | ...... | 414/273 |
| 5,407,316 A * | 4/1995 | Coatta et al. | ...... | 414/787 |
| 2007/0128009 A1 * | 6/2007 | Lee | ...... | 414/253 |
| 2007/0172396 A1 * | 7/2007 | Neeper et al. | ...... | 422/104 |
| 2008/0208389 A1 * | 8/2008 | Checketts | ...... | 700/214 |
| 2015/0068997 A1 * | 3/2015 | Nomura et al. | ...... | 211/134 |
| 2015/0101998 A1 * | 4/2015 | Keck | ...... | 211/49.1 |
| 2015/0114877 A1 * | 4/2015 | Ness | ...... | 206/598 |
| 2015/0175354 A1 * | 6/2015 | Kharkover | ...... | 414/231 |

* cited by examiner

Primary Examiner — Saul Rodriguez
Assistant Examiner — Ashley Romano

(57) ABSTRACT

A method (400) for handling a container is disclosed. It can include the steps of: providing (410) a multi-level structure (450) including a plurality of levels (470) including a first level (472) with an opening (474) to receive a container (476) and a second level (478); locating (420) a plurality of shelves (480) adjacent to the opening (474) including a port shelf (482) and a starboard shelf (484), each configured to receive a container (476); and providing (430) a transfer mechanism (530) configured to pick a container (176) and place it on one of the plurality of shelves (480). Advantageously, the method (400) provides enhanced container handling and logistics, and has wide use cases in warehousing, assembly manufacturing, ports and distribution hubs.

18 Claims, 18 Drawing Sheets

SYSTEM AND METHOD OF HANDLING CONTAINERS

FIELD OF THE INVENTION

This invention relates to the transportation and logistics industry, and more particularly to a system and method of handling containers.

BACKGROUND OF THE INVENTION

Containerization continues to grow at a rapid pace in connection with the intermodal industry. Land at rail and shipping terminals and distribution hubs is at a premium. There is generally a scarce amount of land for expansion to store and accommodate chassis storage on the ground level. With the shortage of land in terminals and hubs, there is a need to better utilize space.

There is a need to handle and store chassis in more efficient ways that have minimal land requirements and footprints.

There is a need to be able to handle, accommodate and temporarily store, a high volume of chassis in proximity to terminals, hubs and the like that accommodate chassis, with multi-level storage stalls or racks.

Bottlenecks are seen in existing rail terminals and hubs, which result in freight delays. Terminal and hub operators would desire to use scarce land for more efficient uses then chassis storage. There is a myriad of potential inefficiencies associated with handling and accessing chassis. For example, ground level storage areas can be cluttered with poorly parked chassis, chassis can be difficult to find or difficult to access, damaged chassis can be intermingled with undamaged ones, etc. which can introduce significant delays, costs and inefficiencies.

In more detail, truck line carriers typically return a chassis to a ground level storage. The truck line carrier or driver can damage a chassis during operation and can deliberately or erroneously deposit the chassis in the "usable chassis area", which is the area designated as serviced and approved to use. This way the truck line carrier or driver avoids a damage claim being made. There is a need to minimize and prevent damage claims not being reported, called "phantom damage".

In further detail, when a subsequent driver picks up a damaged chassis in a ground level storage area and is not aware that the chassis is damaged, unsafe or in need of maintenance, this causes major delays and costs. The driver may not recognize there is damage to the chassis, until a container is placed onto the chassis. Now the container has to be off loaded and the damaged chassis must be taken out of service, and a new undamaged chassis must be put in service. These kind of problems can cause hours of delay for drivers, operations personnel and crane operators. There is a need to minimize erroneous use of damaged chassis.

There is a need to provide a method and device that minimizes the possibility of placing a damaged chassis in service.

There is a need to provide a method and device that minimizes the possibility of placing a damaged chassis in service, by providing a method for examining that inbound chassis are substantially undamaged before they can are placed back in service.

Thus, there is a need for the development of new technologies to improve the efficiency of freight and chassis transfer operations at terminals and distribution facilities.

There is also a need for enhancing efficiencies of drivers, warehouse operations and container logistics.

There is also a need for improved elevated warehouse stacking systems that can provide improved flexibility for warehouse operations, such as in receiving containers to and from truck line carriers.

There is also a need for improved elevated warehouse stacking systems that can relieve congestion and provide temporary or longer term container storage.

BRIEF DESCRIPTION OF THE DRAWINGS

FIG. 3 is a perspective left side view of an embodiment of the system of handling a chassis with a transfer mechanism shown in place to pick up a chassis, in accordance with the instant invention.

FIG. 4 is a perspective left side view of an embodiment of the system of handling a chassis with a transfer mechanism shown in place directly above and in contact to pick up a chassis, in accordance with the instant invention.

FIG. 5 is an enlarged perspective left side view of an embodiment of the system of handling a chassis with a transfer mechanism shown in place directly above and in contact to pick up a chassis as shown in FIG. 4, with interconnecting structure shown moved inwardly and connected to the chassis in accordance with the instant invention.

FIG. 6 is a frontal perspective view of an embodiment of the system of handling a chassis with the transfer mechanism elevated and a chassis interconnected with the interconnecting structure, and a hoist mechanism is shown in a middle position between a plurality of shelves shown, in accordance with the instant invention.

FIG. 7 is an elevated frontal view of an embodiment of the system of handling a chassis with the transfer mechanism elevated, the interconnecting structure interconnected with a chassis, and a hoist mechanism shown in a middle position between a plurality of shelves shown the hoist mechanism is movable in a port direction 262 or starboard direction 264, to place the chassis in a desired shelf, in accordance with the instant invention.

DESCRIPTION OF A PREFERRED EMBODIMENT

1. Container Handling Embodiment

Figure 1:
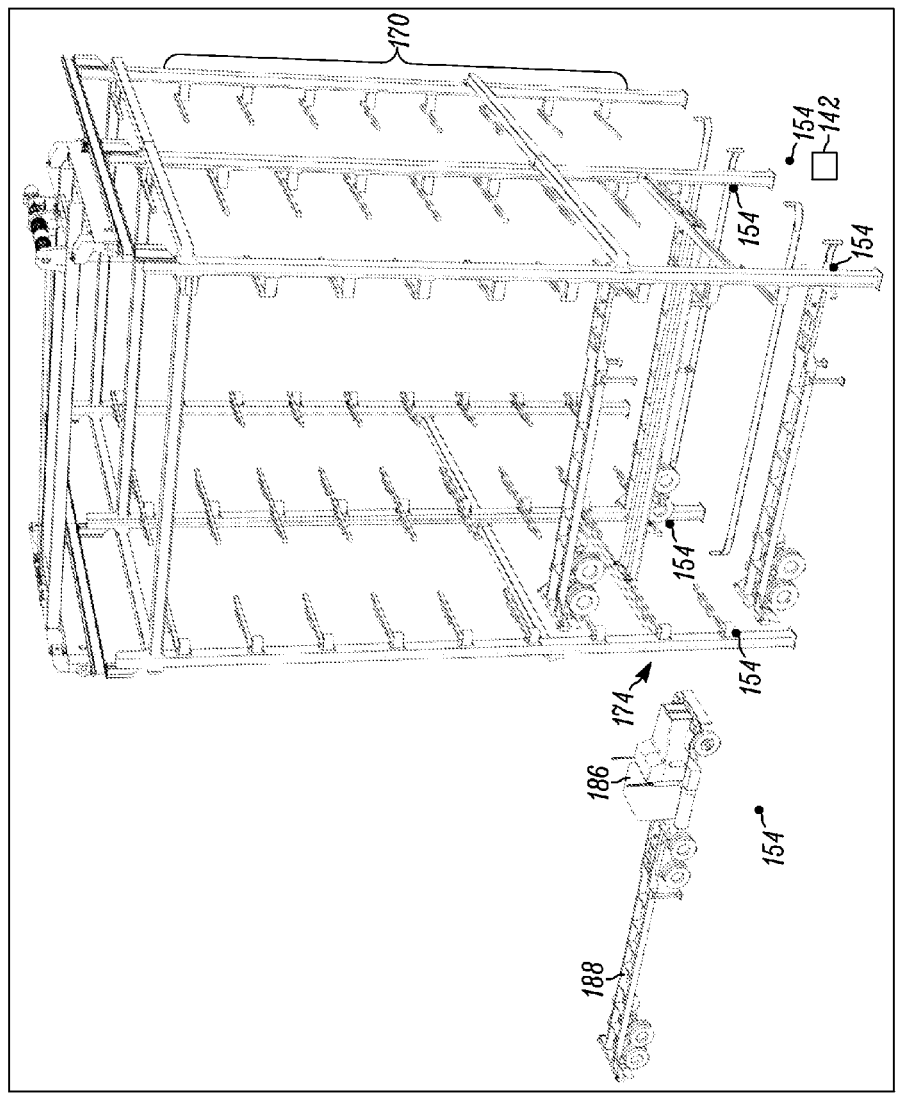
FIG. 1 is an elevated side perspective view of an embodiment of a system and method of handling chassis, in accordance with the instant invention.
Figure 13:
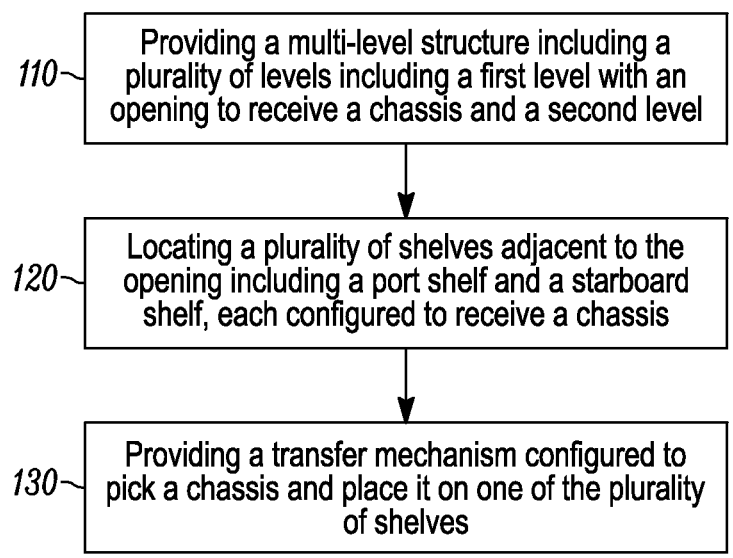
FIG. 13 is a block diagram of an embodiment of the method of handling a chassis, in accordance with the instant invention.

Referring to FIGS. 1 and 13, an exemplary method 100 for handling chassis is shown. It can include the steps of: providing 110 a multi-level structure including a plurality of levels 170 including a first level 172 with an opening 174 to receive a chassis 176 and a second level 178; locating 120 a plurality of shelves 180 adjacent to the opening 174 including a port shelf 182 and a starboard shelf 184, each configured to receive a chassis 176; and providing 130 a transfer mechanism 230 configured to pick a chassis 176 and place it on one of the plurality of shelves 180.

Advantageously, the method 100 provides an efficient method for storing, densely packing and retrieving chassis, in proximity to where they are typically used. This method 100 includes a versatile structure and enables an enhanced process for handing off chassis inbound and outbound. The method is particularly adapted for use in connection with a water or rail port, distribution hub and warehouse.

In one case, the opening 174 is at a ground level and is adapted and complementarily configured to allow a vehicular hauler 186 and a chassis 176 to pass there through, for efficient entering and exiting, and is otherwise substantially unobstructed for simplified traffic flow. The opening can include one or more lanes, depending on traffic flow, for example.

As shown in the figures, the plurality of shelves 180 are complementarily configured to receive and support most conventionally dimensioned or standard sized chassis, from a side and supported from a bottom, for easy handling.

Figure 2:
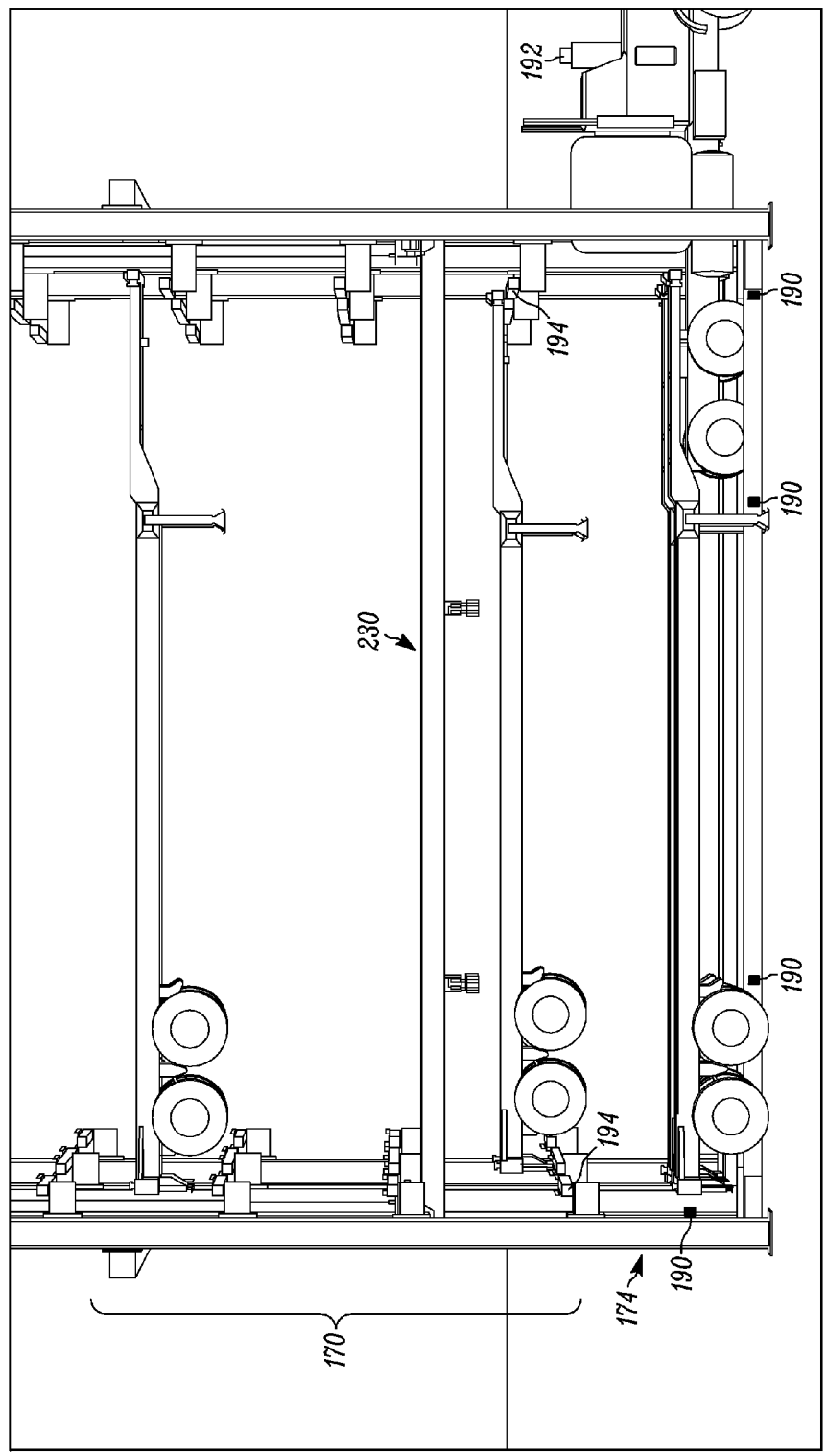
FIG. 2 is a right side view of an embodiment of the system of handling a chassis with a vehicular hauler about to drop off a chassis, in accordance with the instant invention.

As shown in FIG. 2, the method can include sensors 190 or monitors for proper alignment of the chassis in the opening and displays 192 for indicating proper positioning, prior to permitting movement of the transfer mechanism. Proper alignment can facilitate handling of a chassis.

Figure 3:
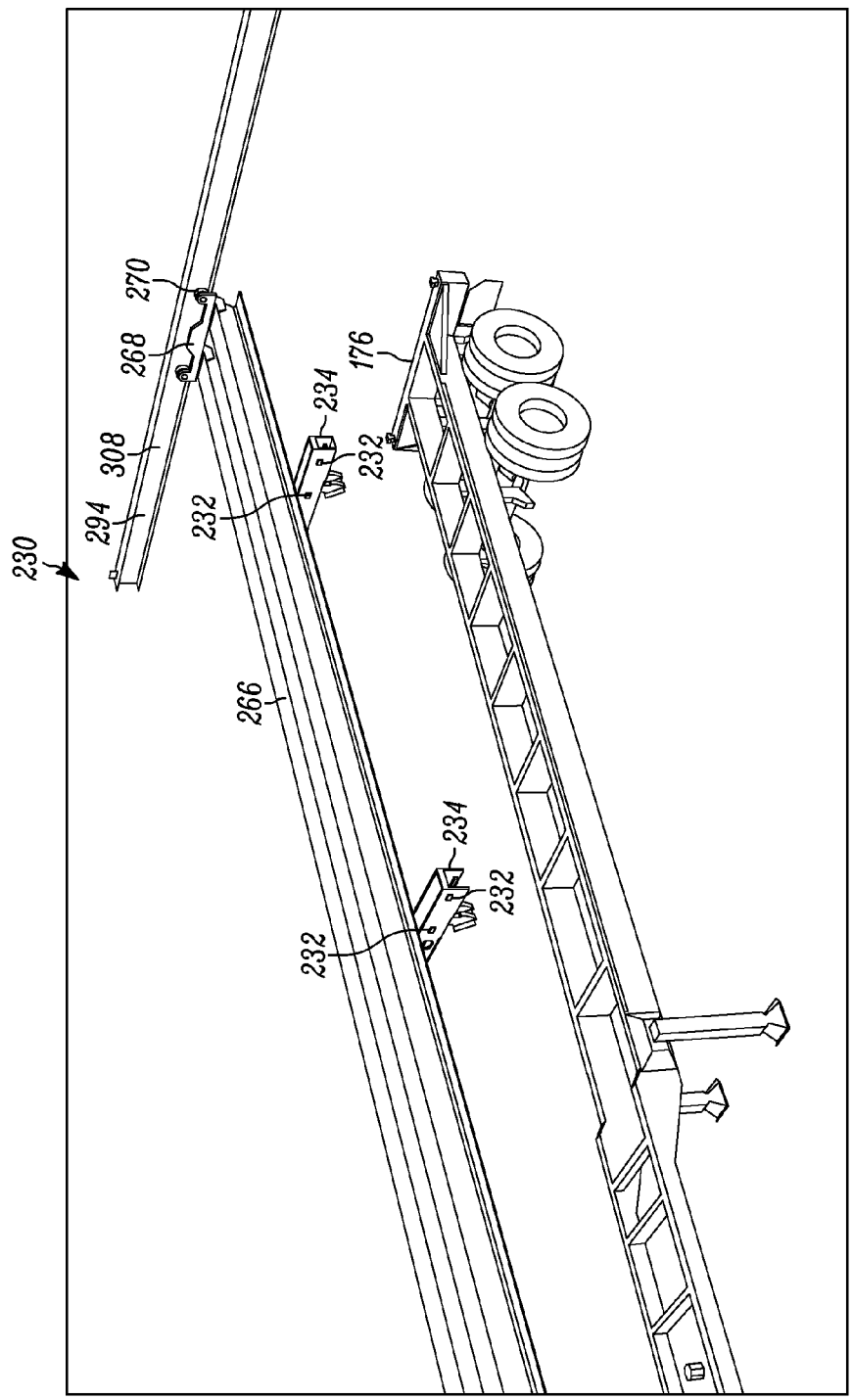
FIGS. 3-7 are simplified elevated perspective views of a sequence of steps relating to the distribution system in FIG. 2.
Figure 4:
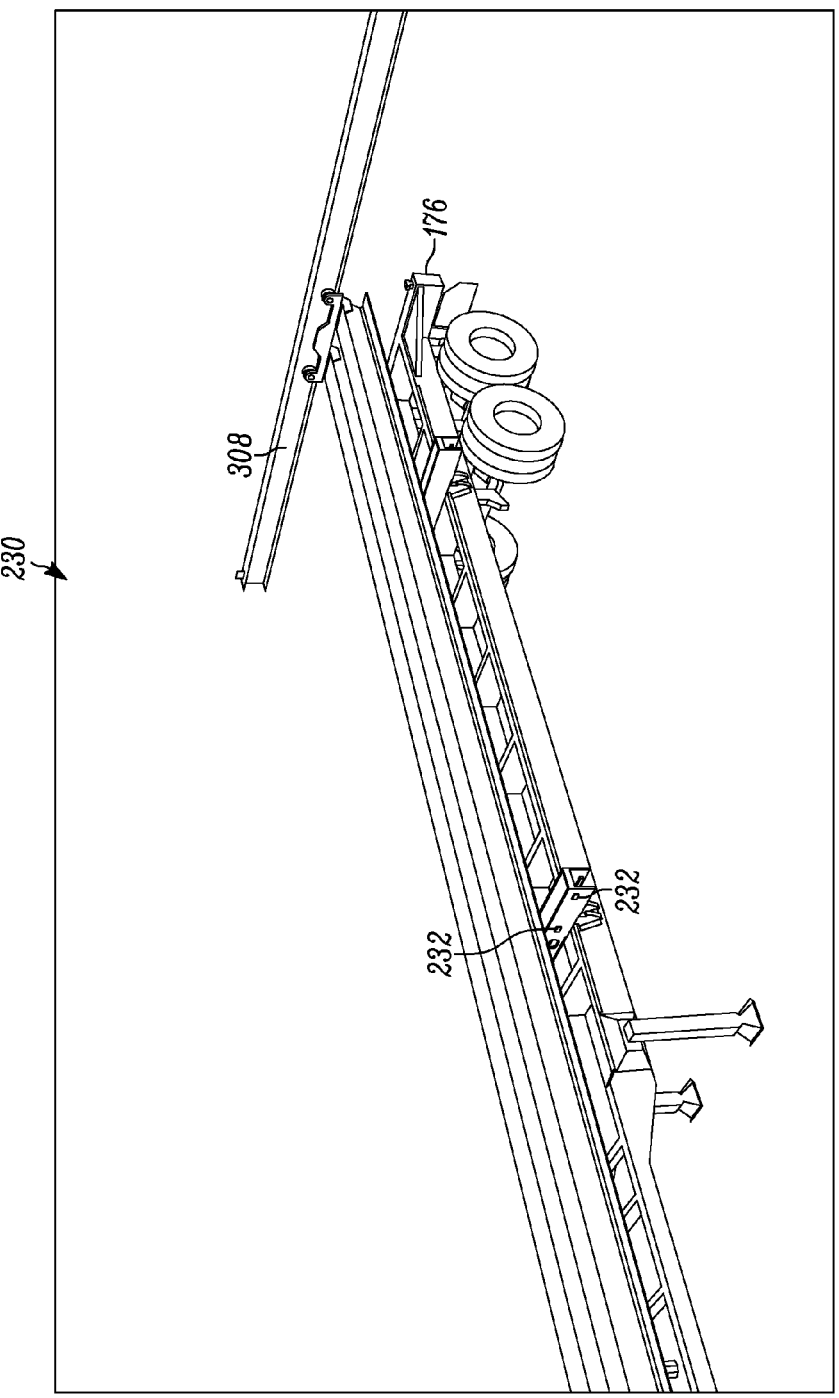
Figure 5:
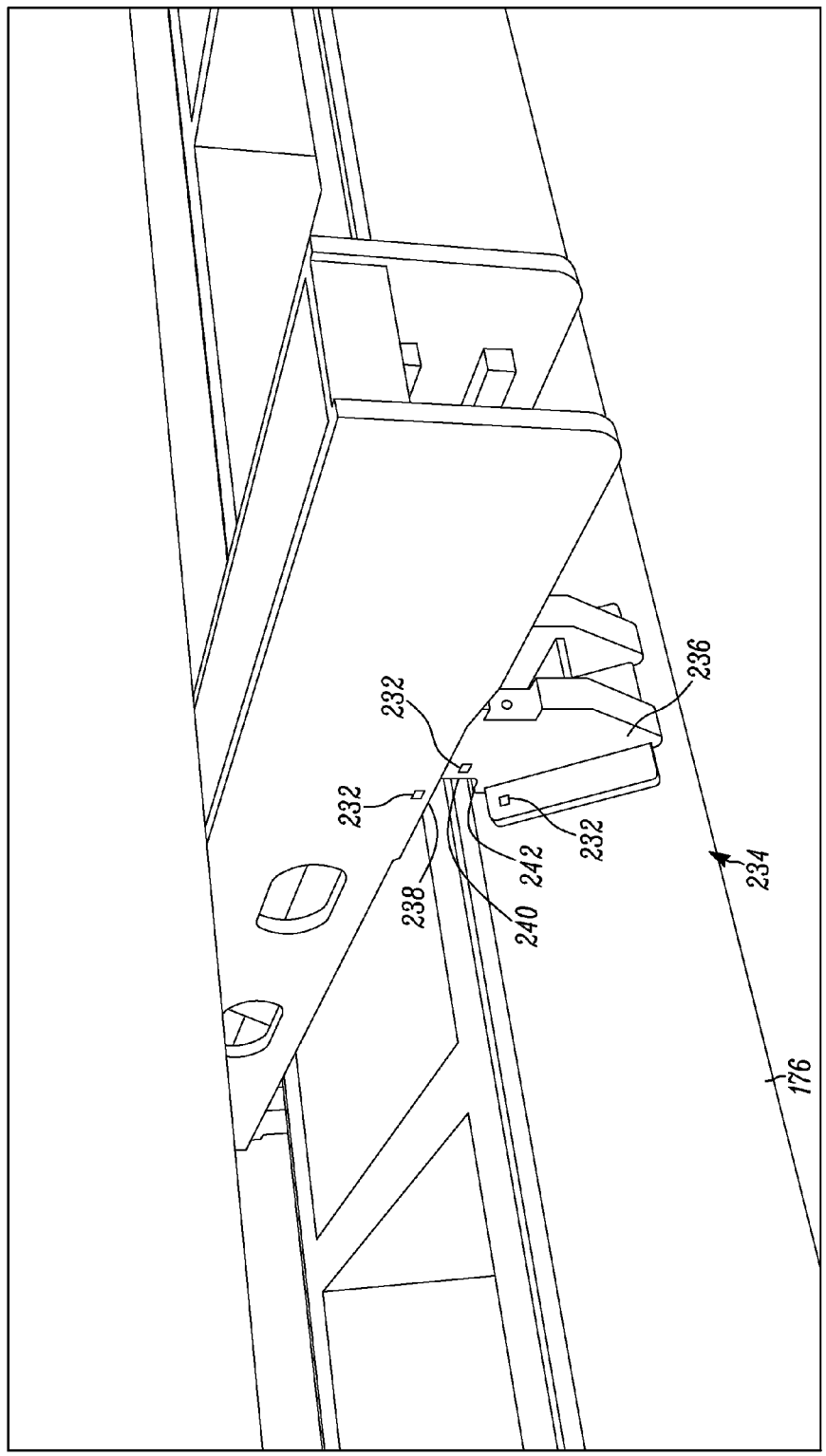
Figure 16:
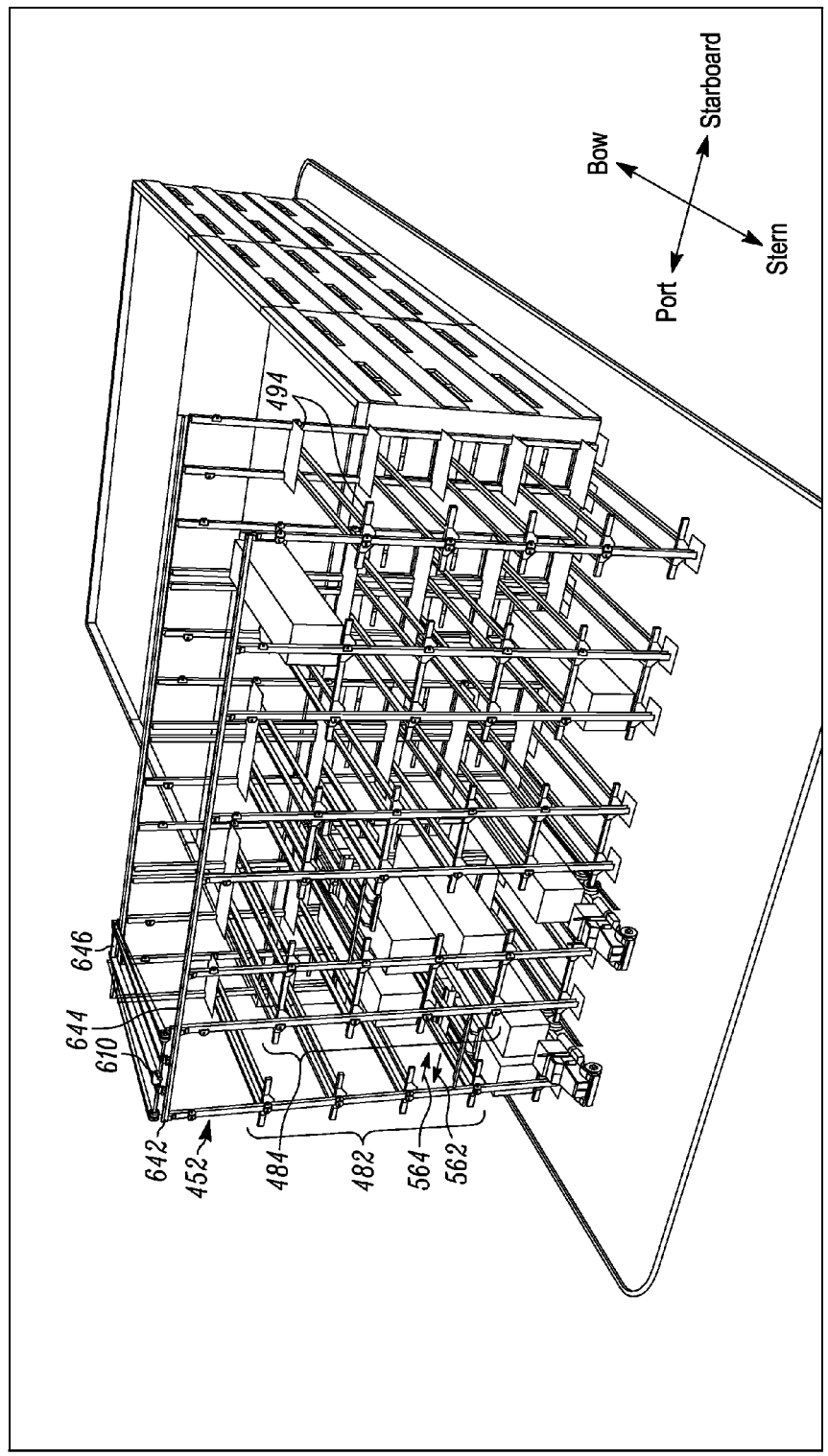
FIG. 16 is an enlarged perspective view of an embodiment of a five story system of handling a container with a transfer mechanism shown above a ground level opening, in a position to pick up a container on a chassis connected to a vehicular hauler, in accordance with the instant invention. This drawing shows a plurality of shelves adapted to receive containers and a lane changing region, to allow the transfer mechanism to move to four ground openings. The system is shown adjacent to a three story warehouse. The openings of the warehouse are adjacent to many of the shelves.

The transfer mechanism 230, in one use case, is configured to be lowered to a chassis 170, as shown in FIG. 3, connected to the chassis 176, as shown in FIGS. 4 and 5, raised with the chassis, and trolleyed, horizontally to side load a shelf 180 generally horizontally with a trolley 260, to a port shelf 182 or starboard shelf 184, as shown by direction arrows 262 and 264, as shown in FIG. 16.

In one embodiment, the transfer mechanism 230 includes sensor monitors 232 strategically positioned throughout the system, for example, to provide alignment information, interconnection information, position information, docking information, etc. For example, one set of sensor/monitors 232 in FIGS. 3-5, can be utilized to provide proper alignment and connection information, as to whether a chassis 176 and the interconnecting structure 234, or claw structure, are properly interconnected, before proceeding further. If properly interconnected/sensed, the operation is allowed to continue, and if not, prompts can be displayed to a control center, driver or system operator, as to possible next steps.

The interconnecting structure 234 in FIGS. 4 and 5, can include four claw structures 236 including three connections including a first connection 238, a second connection 240 and a third connection 242 to receive securely connect to a complementarily configured chassis.

Figure 6:
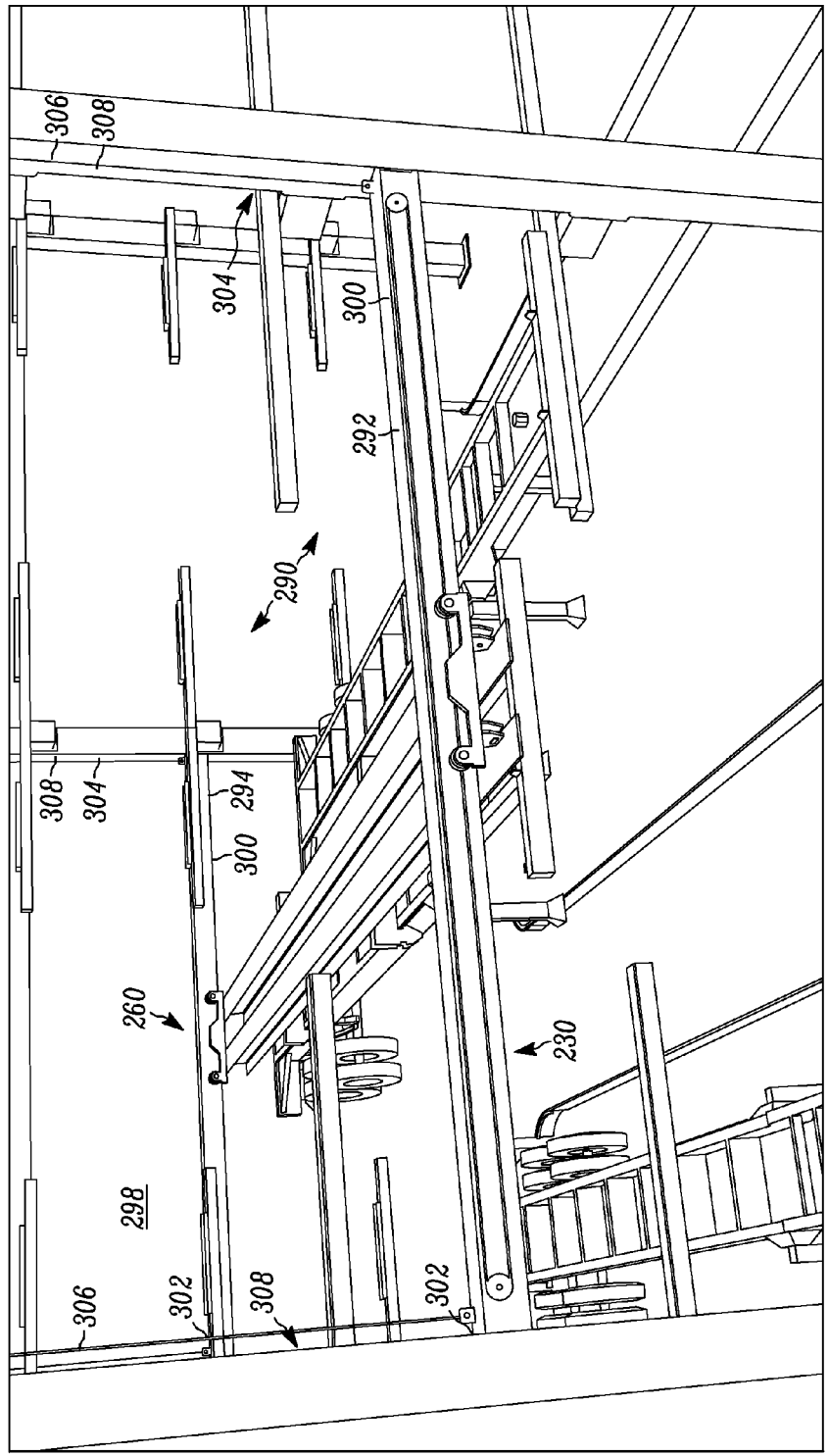

As shown in FIG. 6, the transfer mechanism 230 can further include a hoisting mechanism 290 including lateral elevation supports 292 and 294 in proximity to a bow 296 and a stern 298, the lateral elevation supports 292 and 294 including a port end 300 and a starboard end 302 configured to move vertically along and partially in a channel 304 including a lift cable, defining a first vertical track 326.

As should be understood, the details relative to the running of cables, circuits, and motors are not detailed herein. They can be understood by those skilled in the art. As shown in FIG. 6, the hoisting mechanism 290 includes cables 306, connected to a motor and pulleys, for raising and lowering. The cabling 306 is shown connected near the port end 300 and starboard end 302, for stable and level raising and lowering of the transfer mechanism 230. The track 326 helps to minimize undesirable sway and provides good vertical and horizontal alignment. The track 326 further adds stabilization during lateral trolley movement. In more detail, the channel 304 is complementarily configured to receive the port end 300 and the starboard end 302.

Figure 7:
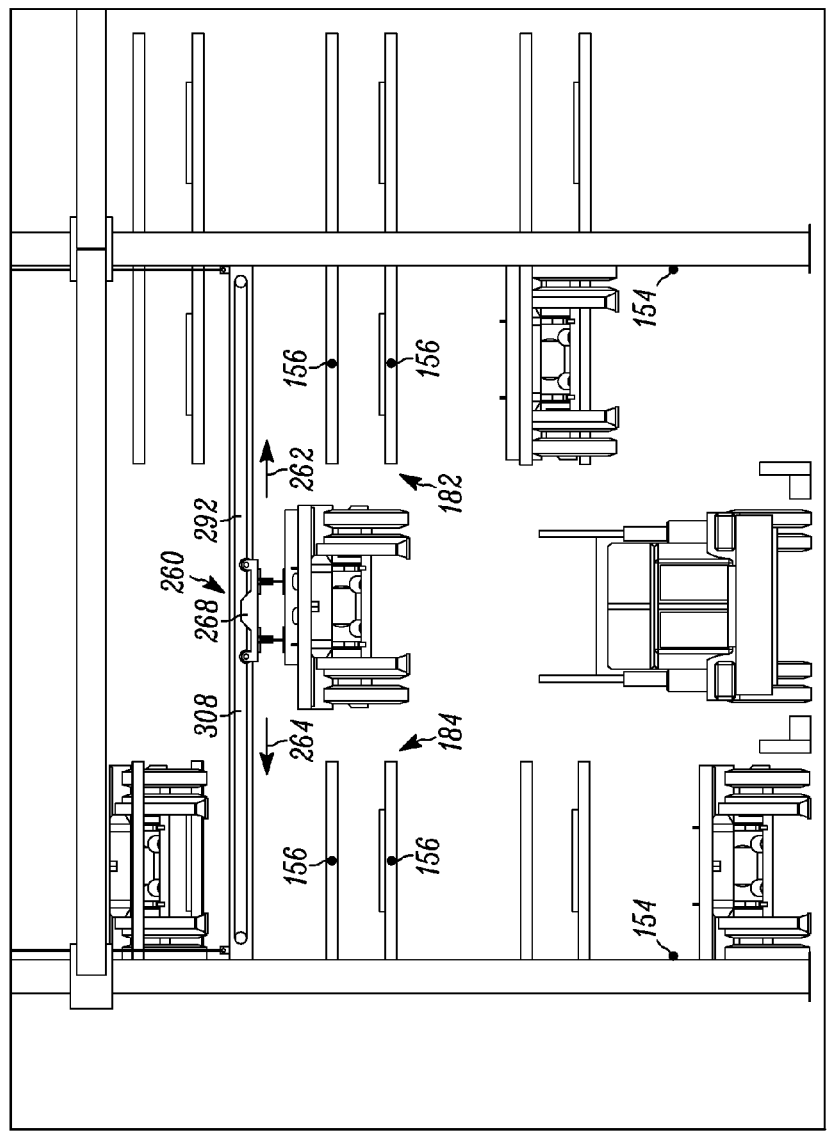

As shown in FIG. 7, the transfer mechanism 230 includes a trolley 260 configured to laterally move a chassis 176 into or out of one of the plurality of shelves 180 from a side, along arrows 262 and 264. Advantageously, this feature allows and facilitates population of the shelves 180 from the side, from an area above the opening 174 laterally along arrows 262 and 264, to a desired shelf.

In one embodiment, as shown in FIGS. 3 and 7, the trolley 260 includes a longitudinal support 266 including an interface 268 with rollers 270 connected to the bow and stern lateral elevation supports 292 and 294 having an opening or channel 308 defining a channel of the hoisting mechanism 290. The trolley 260 is configured to move generally horizontally via the rollers 270 along the channels 308. The channels 308 are complementarily configured to receive rollers 270. This feature provides enhanced trolley movement along arrows 262 and 264 of FIG. 7, for facilitating populating and retrieval of chassis in shelves from the side.

Figure 8:
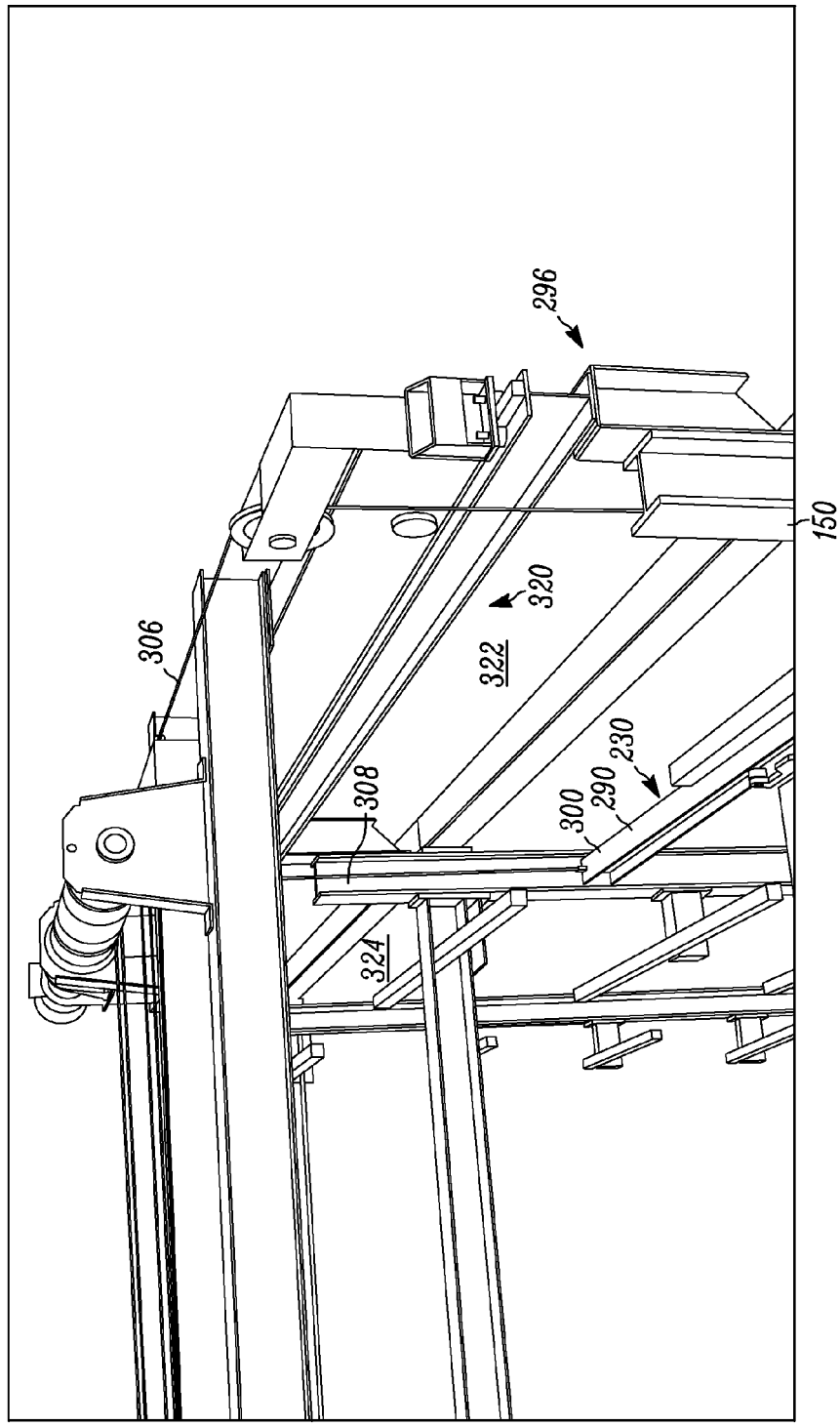
FIG. 8 is an enlarged elevated side perspective view of an embodiment of the system of handling a chassis with a partial view of the hoisting mechanism 290 shown near an upper portion below an overpass region 320, that allows the transfer mechanism 230 in a first module 322 to move to a second module 324, in accordance with the instant invention.
Figure 9:
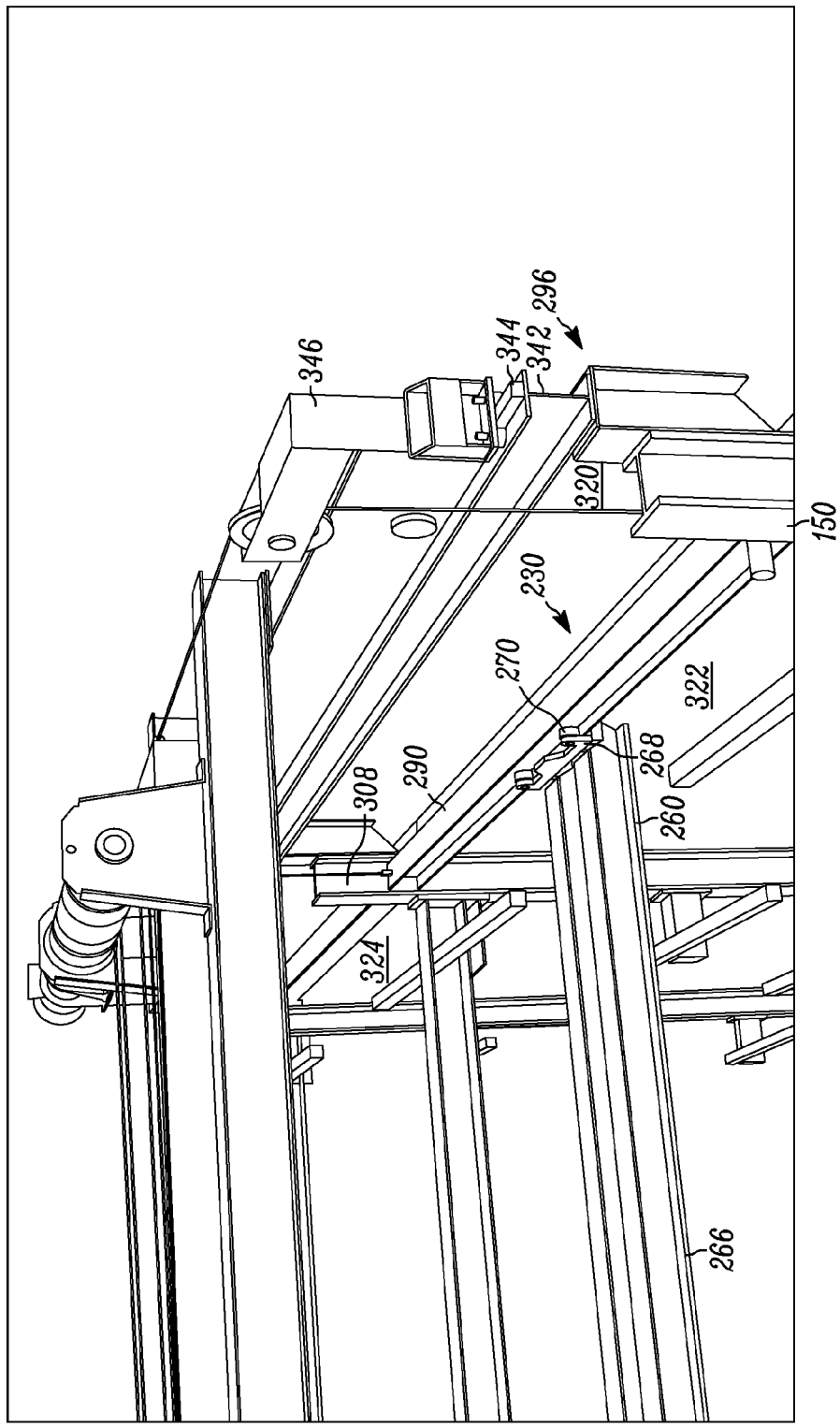
FIG. 9 is an enlarged elevated side perspective view of an embodiment of the system of handling a chassis with a partial view of the hoisting mechanism 290 shown immediately below an overpass region 320, that allows the transfer mechanism 230 to move to a second module 324, in accordance with the instant invention.

Turning to FIG. 8, the method can further include providing a lane changing region 152 or "over pass region" 320 (in FIG. 9-12) of the multi-level structure 150 for the transfer mechanism 230. This feature provides modularity and allows a single transfer mechanism 230 to service multiple lanes or modules 322 and 324, thus being more cost effective, as best shown in FIG. 1.

Figure 10:
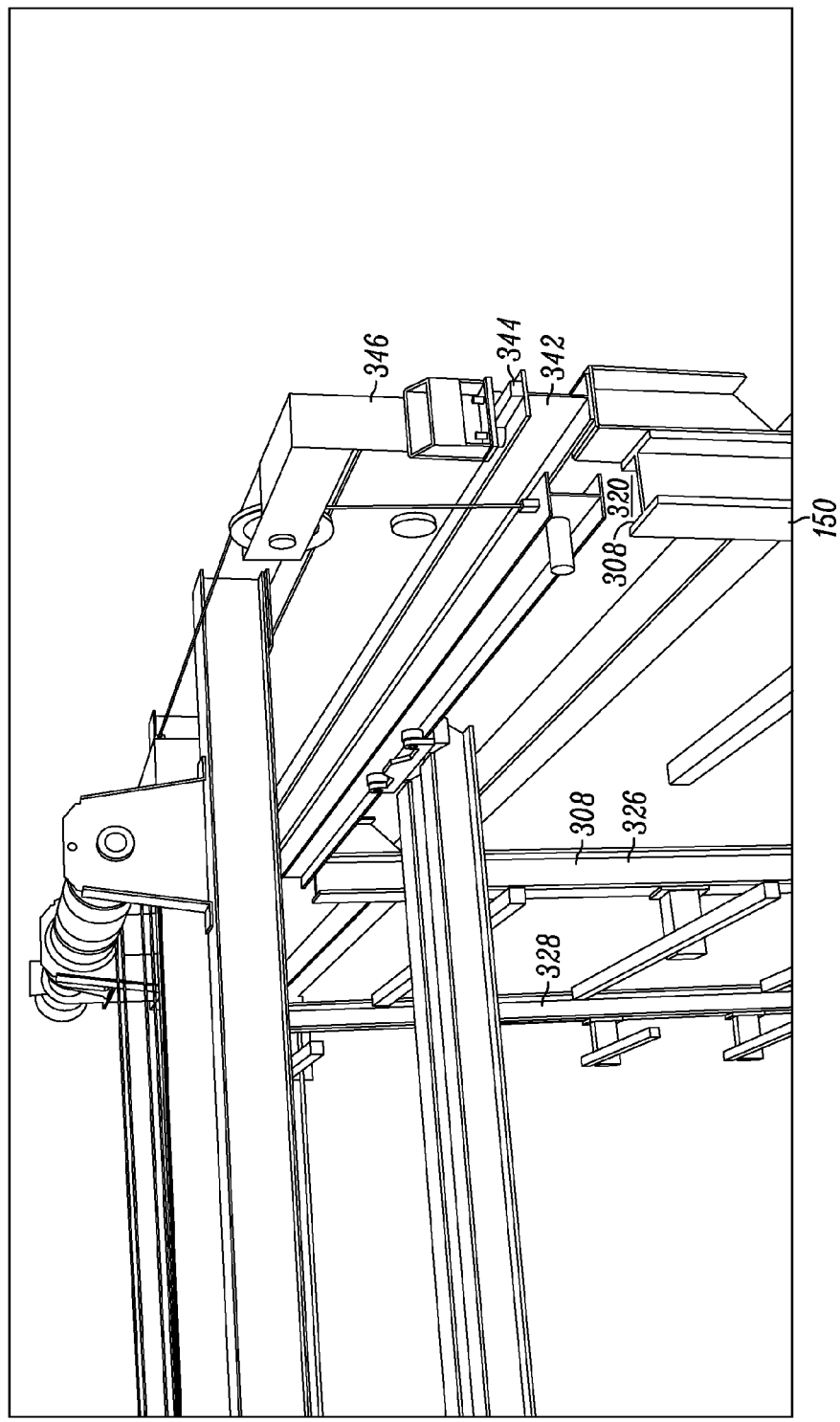
FIG. 10 is an enlarged elevated side perspective view of an embodiment of the system of handling a chassis with a partial view of the hoisting mechanism 290 shown in the overpass region 320, that allows the transfer mechanism 230 to move to a second module 324, in accordance with the instant invention.

Stated differently, the transfer mechanism 230 can be transferred from a first vertical track 326 to a second vertical track 328 by use of the "over pass region" 320, to service two ground lanes, as shown in FIG. 10. In more detail, the transfer mechanism 230 is moved above the first vertical track 326 and moved laterally to a second vertical track 328, as shown for example in FIGS. 10-12. In more detail, the multi-level structure 150 includes providing a plurality of vertical supports 340 with channels 308 configured to partially receive a port end 300 and a starboard end 302 of lateral elevation supports 292 of a hoisting mechanism 290. This structure can be used for the first vertical track 326, second vertical track 328 and subsequent vertical tracks thanks to the modularity of this invention.

In a preferred embodiment, the method includes moving the transfer mechanism 230 to an over pass region 320 and transferring the transfer mechanism 230 to a second module 324 that can be elevated and lowered down the second track 328. This can be done by the use of tracks, as detailed herein. Beneficially, this feature allows modularity or a plurality of lanes to be used, with a single transfer mechanism. Thus, this feature allows a single transfer mechanism to service multiple lanes and modules, which provides enhanced cost effectiveness.

In another embodiment, a system for improved stacking, storing, inventorying and retrieving of chassis, is shown in FIGS. 1 and 7. The system includes: a multi-level structure 150 including a plurality of levels 170 including a first level 172 with an opening 174 to receive a chassis 176 and a second level 178; a plurality of shelves 180 adjacent to the opening 174 including a port shelf 182 and a starboard shelf 184, each configured to receive a chassis; and a transfer mechanism 230 configured to pick a chassis and place it on one of the plurality of shelves 180. Advantageously, the system provides space savings and a relative small footprint, is an efficient, versatile and productive way to store, handle, inventory, densely pack and retrieve chassis in proximity to where they are needed.

Advantageously, the system does not require real time coordination between a system operator and truck driver, thus facilitating the process and making the operation more efficient. In various embodiments, a driver can actuate the system, drop off a chassis or it can be automated, once properly populated in the opening.

In one embodiment, monitor/sensors 156 are located in each of the plurality of shelves 180. This can provide real time inventory monitoring of the shelves 180. Thus, a control center would know where each chassis in the system in located, if desired. Thus, for example, shelves can be monitored and it could be determined that a particular chassis is located in an out of service shelf and a second is located in an in service shelf. The sensors 156 can provide proper alignment in shelves information, as well as tracking and inventory monitoring.

The system can be controlled and/or monitored on site or remotely, by a control center, with real time inventory tracking of chassis in the system. Conversely, manual operation is possible as well. An automation feature can be provided in one embodiment, which includes sensors 190, sensing proper alignment of a chassis in the opening, if properly aligned, actuate the system, as best shown in FIG. 2. The system provides improved and efficient handling of chassis, for storage or retrieval.

The system has particular application in connection with water and rail terminals, distribution hubs, repair shops, warehouses and other areas using chassis. The system provides an unobstructed and easy access structure to store and retrieve a large number of chassis.

In a preferred embodiment, the plurality of shelves 170 are complementarily configured to receive and support conventional chassis. Preferably, each shelf includes laterally extending member 194, as shown in FIG. 2, to provide a complementarily configured dock or rack for receiving a chassis 176 portion securely. This construction is particularly adapted to receive chassis from a side and support from a bottom, in a secure dock like fashion.

As previously detailed with respect to FIGS. 3-7, the transfer mechanism 230 is configured to be lowered to a chassis, connected to the chassis, raised vertically and trolleyed horizontally to side load at least one of the plurality of shelves 180, providing a secure dock or rack for storage and retrieval.

In a preferred embodiment, the transfer mechanism 230 includes a hoisting mechanism 290 including lateral elevation supports 292 and 294 in proximity to a bow 296 and a stern 298, the lateral elevation supports 292 and 294 including a port end 300 and a starboard end 302 configured to move vertically along and partially in a channel 304 comprised of three vertical surface, forming a guide or track 326. The channel 304 provides minimal undesirable sway and stabilization during lateral trolley movement. In more detail, the channel defines a first vertical track 326 complementarily configured to receive the port 300 and the starboard ends 302. The hoisting mechanism 290 includes cables, connected to motor, for raising and lowering.

The chassis system 100 can include imagers 154, sensors and the like being strategically located to precisely provide a real time inventory, precise location of each chassis in the structure 150 and can monitor each step in connection with the method 100. For example, strategically positioned imagers can scan the tractor ID number and take pictures of or video each chassis, when entering and exiting the structure 150. Advantageously, a control station can monitor and operate all stacking activity on site or at a remote location. Advantageously, this can help to eliminate phantom damage claims and can provide locations of each chassis in the structure 150.

Thus a driver will not have to search a yard for a chassis. Also, the possibility of damaged chassis being erroneously placed in service can be minimized.

The transfer mechanism 230 includes a trolley 260 configured to laterally move a chassis into or out of one of the plurality of shelves 170 from a side along arrows 262 and 264 in FIG. 7. This structure enhances and facilitates population and retrieval of chassis in the shelves, from the side, and provides simplified access to elevated levels of shelves above the opening, both vertically and laterally. The shelves 180 provide secure docks which are at least partially complementarily configured to receive, securely dock and support many conventional chassis.

As shown in FIGS. 3 and 6, the trolley 260 can include a longitudinal support 266 with interface ends 268 including rollers 270 connected to the lateral elevation supports 292 and 294 having an opening defining a channel 308 of a hoisting mechanism 290. The trolley 260 is configured to move generally horizontally via the rollers 270 along the channels 308. This structure provides secure trolleying, and helps to facilitate population and retrieval of chassis in shelves from the side, along arrows 262 and 264. The channels 308 can be complementarily configured to receive rollers 270.

As should be understood, a variety of designs in connection with cabling, controls, hydraulics, pneumatics and motors would be included, but are not shown in detail in the drawings. This structure can be connected and utilized in various conventional manners, as understood in the art.

In a preferred embodiment, a lane changing region or "over pass region" 320 feature is provided in FIGS. 8-12. The over pass region 320 can be configured to allow the transfer mechanism 230 to be moved from a first vertical track 326 to a second vertical 328 track to allow a single transfer mechanism to service multiple lanes or modules 322 and 324. Stated differently, the system is configured to allow simple movement of the transfer mechanism 230 to the lane changing region and transferring the transfer mechanism to a second module 324 to service a second or subsequent lane. This structure provides cost effectiveness and expandability and modularity of the system.

Figure 11:
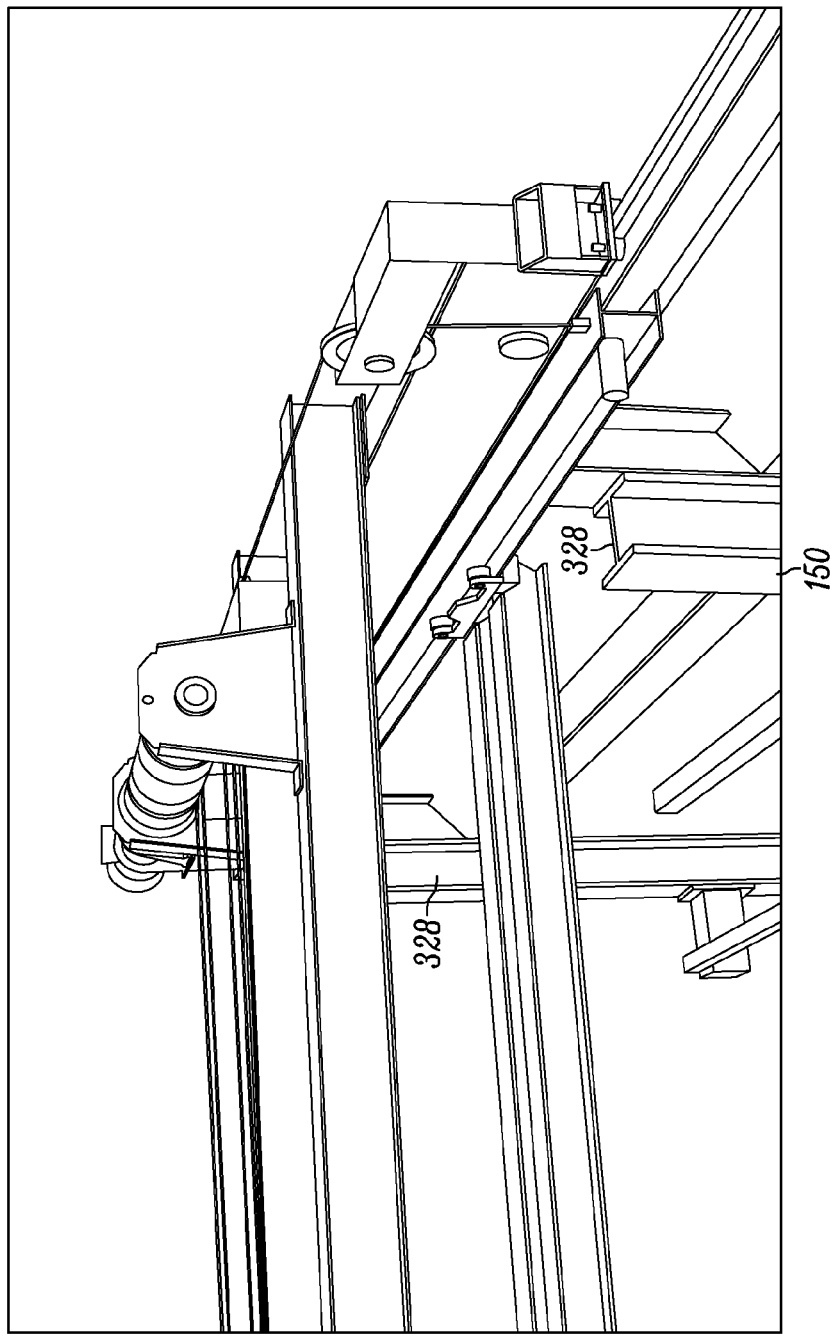
FIG. 11 is an enlarged elevated side perspective view of an embodiment of the system of handling a chassis with a partial view of the hoisting mechanism 290 shown in the overpass region 320, the transfer mechanism 230 is in the process of moving from the first module 322 to a second module 324, in accordance with the instant invention.
Figure 12:
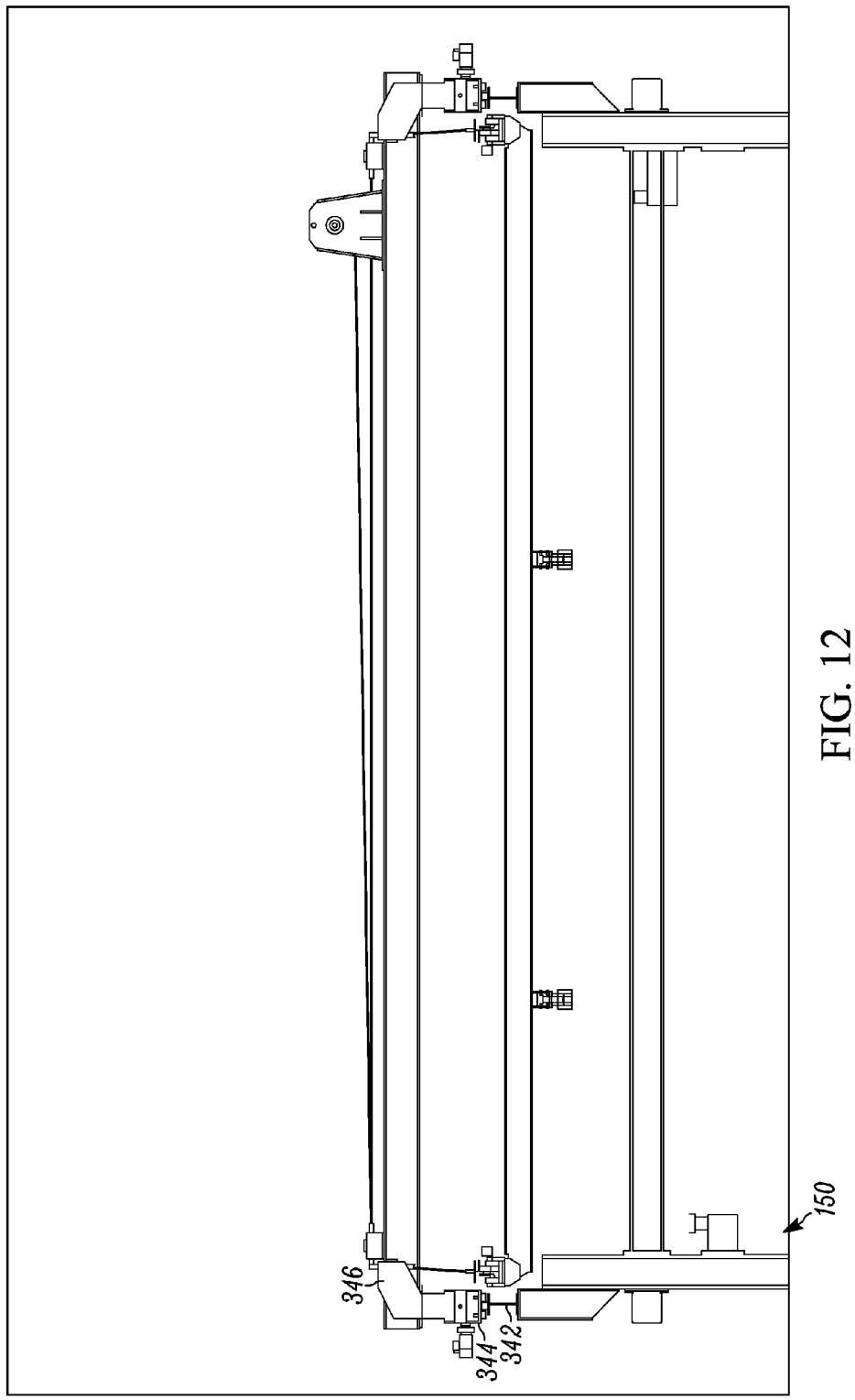
FIG. 12 is an elevated right side view of an embodiment of the system of handling a chassis with a partial view of the hoisting mechanism 290 shown in the overpass region 320, the transfer mechanism 230 is in the process of moving from the first module 322 to a second module 324, in accordance with the instant invention.

In more detail, the over pass region 320 can include raising the transfer mechanism 230 above first track 326; moving the transfer mechanism 230 horizontally along horizontal supports 342 along a horizontal track 344; and transferring the transfer mechanism 230 to a second vertical track 328, as shown in FIGS. 11 and 12. An overpass mechanism 346 moves the transfer mechanism from first module 322 to second module 324. It can be motorized to move it.

Advantages:
1. The system allows an operator to easily sort, with one section including unusable chassis and a second including damaged out of service chassis.
2. Example One: A Chassis Rack System is shown in the figures. The system can vary widely. One embodiment can include two chassis racks with 10 high elevations storing 10 chassis per rack for storage 10 ft wide and 45 ft long, each rack requires 450 sq feet times 2 racks equals 900 sq feet. One 10 ft lane 45 feet long is 450 sq ft for 20 chassis stacking requires approximately 1350 sq feet of land. In contrast, a single level storage system with a similar capacity would require about 14000 sq ft of ground. Thus a multilevel stacking system could require about 10,307 sq feet less than a single level storage area.
3. The number of chassis racks can be set up in pairs and can be erected back to back with 10 ft truck lanes for every chassis rack set. A single chassis rack can also be erected with one or two tractor lanes on either side of the chassis rack.
4. On many occasions truck line carriers return chassis in a damaged condition. A truck line carrier with a damaged chassis may deliberately deposit the chassis in the usable chassis area, that has been serviced and approved to use. This way the truck line carrier prevents a damage claim. In one example, the Handling System can help to minimize chassis damage claims not being reported, called "phantom damage". In one embodiment, a chassis is photographed or taped upon deposit of the chassis, at an inbound rack area. Pictures and video can be taken by imagers 154, to record when a chassis is delivered, identify the truck line carrier tractor, for example on the left hand door, inspect and record the condition and record a storage location of the chassis. This can help to minimize instances of a truck line carrier picking up a damaged chassis.
5. Yet another example includes when a truck line carrier needs to exchange a chassis, he must wait for a crane availability to unload a container off the original chassis and then must find an exchange chassis in the terminal, return to the crane area and have the container lifted off the ground and placed on the exchange chassis. This operation can take 1 to 3 hours depending on the availability of the crane and finding the correct length chassis he is exchanging to carry the container. The chassis rack 10-high system takes 10 ten minutes.

2. Container Handling Embodiment

Figure 14:
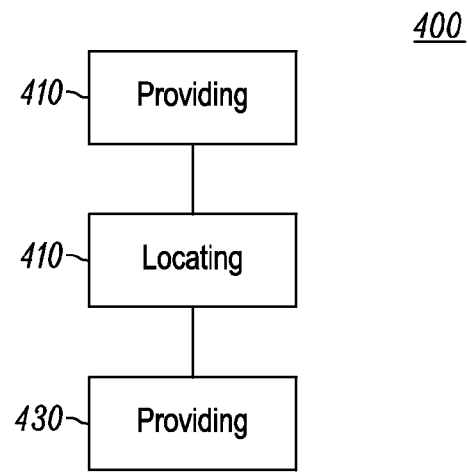
FIG. 14 is a block diagram of an embodiment of a method of handling a container, in accordance with the instant invention.
Figure 15:
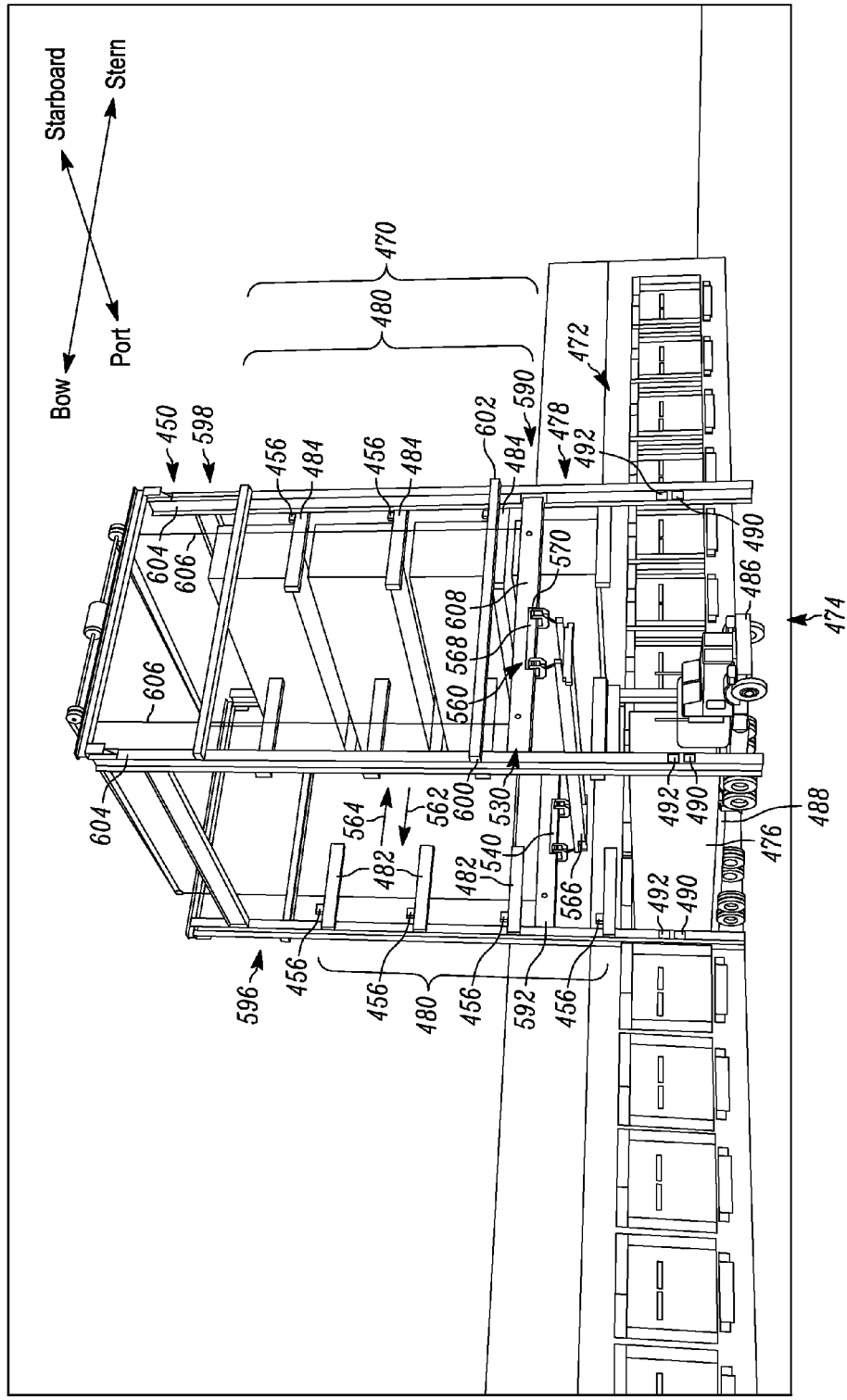
FIG. 15 is an enlarged perspective view of an embodiment of a five story system of handling a container with a transfer mechanism shown above a ground level opening, normally where it could pick up a container on a chassis, in accordance with the instant invention. The chassis and container in this figure is not in place to be picked up by the transfer mechanism. The system is shown adjacent to a one story warehouse. The openings of the warehouse at ground level, are not adjacent to many of the shelves.

Referring to FIGS. 14 and 15, an exemplary method 400 for handling a container is shown. It can include the steps of: providing 410 a multi-level structure 450 including a plurality of levels 470 including a first level 472 with an opening 474 to receive a container 476 and a second level 478; locating 420 a plurality of shelves 480 adjacent to the opening 474 including a port shelf 482 and a starboard shelf 484, each configured to receive a container 476; and providing 430 a transfer mechanism 530 configured to pick a container 176 and place it on one of the plurality of shelves 480.

Advantageously, the method 100 provides an efficient process for storing, densely packing and retrieving containers, in proximity to where they are typically used. This method 100 includes a versatile structure and enables an enhanced process for handing off containers inbound and outbound. The method is particularly adapted for use in connection with warehouses, assembly manufacturing, ports and distribution hubs.

In one case, the opening 174 is at a ground level and is adapted and complementarily configured to allow a vehicular hauler 486 and a chassis 488 to pass there through, for efficient entering and exiting, and is otherwise substantially unobstructed for simplified traffic flow. The opening 474, can be similar to a roadway or driveway, adapted for facilitating and simplifying flow of containers entering or exiing, for example.

As shown in the figures, the plurality of shelves 480 are complementarily configured to receive and support most conventionally dimensioned or standard sized containers, from a side and supported from a bottom, for easy handling.

Figure 17:
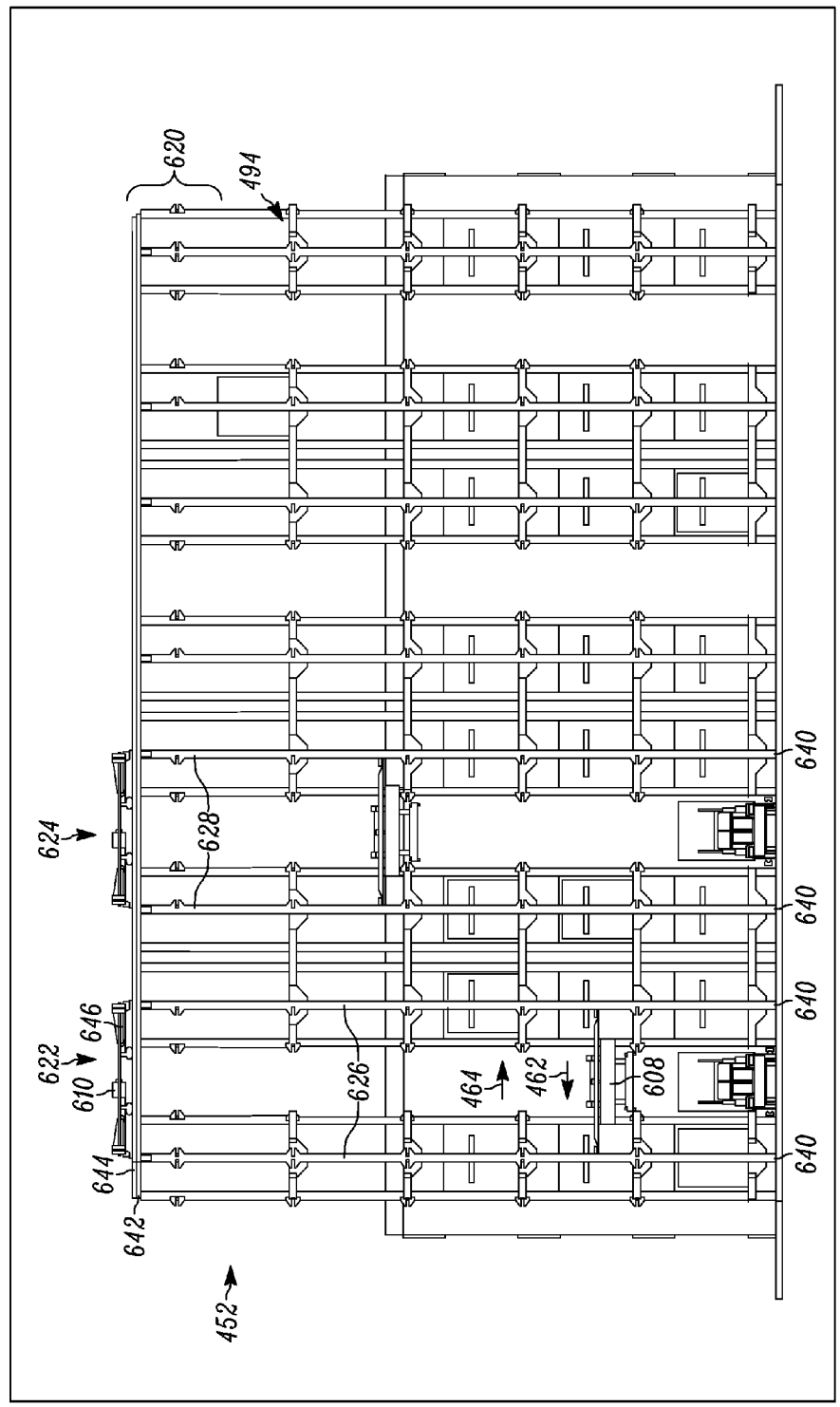
FIG. 17 is an enlarged elevated rear view of an embodiment of a five story system of handling a container with a transfer mechanism shown above a ground level opening, in a position to pick up a container on a chassis connected to a vehicular hauler, in accordance with the instant invention. This drawing shows a plurality of shelves adapted to receive containers and a lane changing region, to allow the transfer mechanism to move to four ground openings and four different modules, as shown in FIG. 16.
Figure 18:
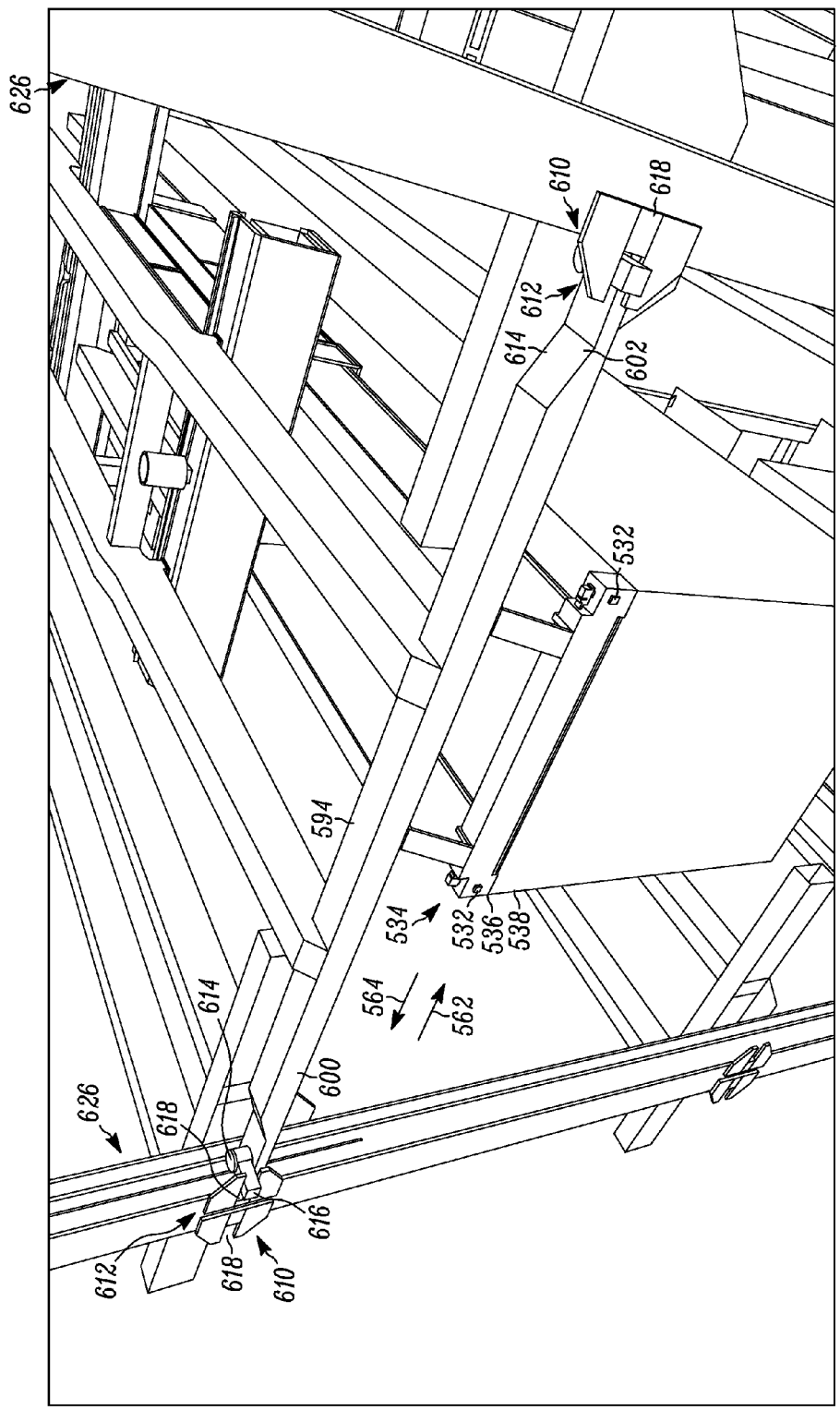
FIG. 18 is an enlarged perspective view of a portion of an embodiment of a system of handling a container with anti-sway connections, adapted to minimize sway when moving a container into or out of a shelve, in a direction of arrows 562 and 564, in accordance with the instant invention.

In one embodiment, the transfer mechanism 530 is configured to be lowered to a container, connected to the container, raised and trolleyed to side load at least one shelf generally horizontally with a trolley 560, to a port shelf 482 or starboard shelf 484, as shown by direction arrows 562 and 564, as shown in FIGS. 16-18. In FIG. 15, the transfer mechanism 530 can include a fine hoisting mechanism 540 for fine raising or lowering of a container on a shelf, typically after trolleying.

Figure 19:
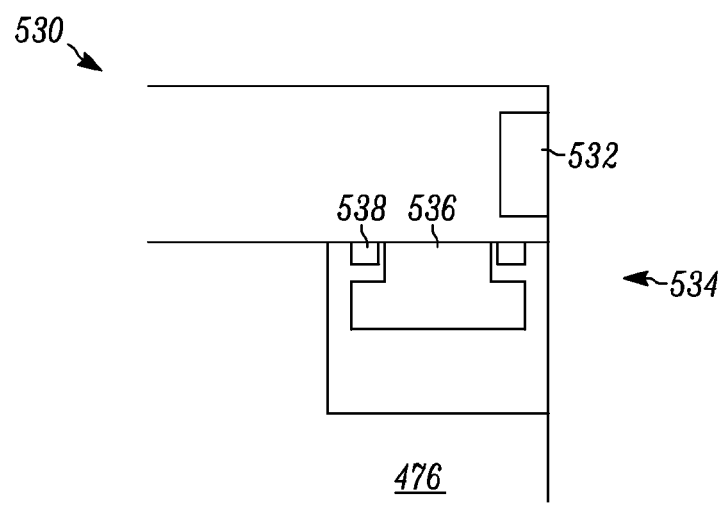
FIG. 19 is an enlarged simplified view of a portion of an embodiment of a system of handling a container, showing inter-connecting structure 534 for connecting a male connector 536 with a corner casting 538 of a container, in accordance with the instant invention.

The method 400 can further include at least one of sensing alignment of the container in the opening 474 and sensing secure interconnection between connectors 536 of the transfer mechanism and corner castings 538 on the container 476, prior to movement of the transfer mechanism 530. As shown in FIG. 15, the method can include sensors 490 and for assisting with proper alignment of the chassis in the opening 474 and sensor/monitors 532 for sensing secure interconnection between connectors 536 of the transfer mechanism and corner castings 538 on the container 476, as seen in FIG. 19. Displays 492 such as lights, prompts, monitors, and the like, can be used for indicating proper positioning and interconnecting, prior to permitting movement of the transfer mechanism 530.

In one embodiment, the transfer mechanism 530 includes sensor monitors 232 strategically positioned, for example, to provide alignment information, interconnection information, position information, docking information, etc. For example, one set of sensor/monitors 532 in FIG. 19, can be utilized to provide proper alignment and connection information, as to whether a container 476 and the interconnecting structure 534, are properly interconnected, before proceeding further. If properly interconnected/sensed, the operation is allowed to continue, and if not, prompts can be displayed to a control center, driver or system operator, as to possible next steps.

The transfer mechanism 530 in FIGS. 15-17, can further include a hoisting mechanism 590 including lateral elevation supports 592 and 594 in proximity to a bow 596 and a stern 598, the lateral elevation supports 592 and 594 including a port end 600 and a starboard end 602 configured to move vertically along and partially in a channel 604, defining a first vertical track 608. Cables 606 lift hoisting mechanism 590. The hoisting mechanism 290 shown in FIGS. 6 and 7, is substantially similar to the hoisting mechanism 590 detailed immediately above, in FIGS. 15-17.

As should be understood, the details relative to the running of cables, circuits, and motors are not detailed herein. They can be understood by those skilled in the art. As shown in FIG. 15, the hoisting mechanism 590 includes cables 606, connected to a motor and pulleys, for raising and lowering. The cabling 606 is shown connected near the port end 600 and starboard end 602, for stable and level raising and lowering of the transfer mechanism 530. The track 608 helps to minimize undesirable sway and provides good vertical and horizontal alignment. The track 608 further adds stabilization during lateral trolley movement. In more detail, the channel 604 is complementarily configured to receive the port end 600 and the starboard end 602.

In FIG. 15, the transfer mechanism 530 includes a trolley 560 configured to laterally move a container 476 into or out of one of the plurality of shelves 480 from a side, along arrows 562 and 564, in FIG. 16. Advantageously, this feature allows and facilitates population of the shelves 480 from the side, from an area above the opening 474 laterally along arrows 562 and 564, to a desired shelf.

In one embodiment, the trolley 560 includes a longitudinal support 566 including an interface 568 with rollers 570 connected to the bow and stern lateral elevation supports 592 and 594 having an opening or channel 508 defining a channel of the hoisting mechanism 590. The trolley 560 is configured to move generally horizontally via the rollers 570 along the channels 608. The channels 608 are complementarily configured to receive rollers 570. This feature provides enhanced trolley movement along arrows 562 and 564 of FIG. 15, for facilitating populating and retrieval of containers in shelves, from the side.

In FIGS. 16 and 17, the method can further include providing a lane changing region 452 or "over pass region" 620, of the multi-level structure 450, for the transfer mechanism 530. This feature provides modularity and allows a single transfer mechanism 530 to service multiple lanes or modules 622 and 624, thus being more cost effective, as best shown in FIGS. 16 and 17.

Stated differently, the transfer mechanism 530 can be transferred from a first vertical track 626 to a second vertical track 628 by use of the "over pass region" 620, to service two or more ground lanes, as shown in FIG. 16. In more detail, the transfer mechanism 530 can be moved above the first vertical track 626 and moved laterally along track 644, to a second vertical track 628. In more detail, the multi-level structure 150 includes providing a plurality of vertical supports 640 with channels 608 configured to partially receive a port end 600 and a starboard end 602 of lateral elevation supports 592 of a hoisting mechanism 590, as shown in FIG. 18. This structure can be used for the first vertical track 626, second vertical track 628 and subsequent vertical tracks thanks to the modularity of this invention.

In a preferred embodiment, the method includes moving the transfer mechanism 530 to an over pass region 620 and transferring the transfer mechanism 530 to a second module 624 that can be elevated and lowered down the second track 628. This can be done by the use of tracks, as detailed herein. Beneficially, this feature allows modularity or a plurality of lanes to be used, with a single transfer mechanism. Thus, this feature allows a single transfer mechanism to service multiple lanes and modules, which provides enhanced cost effectiveness.

In FIG. 18, anti-sway connectors 610 are shown. They are adapted to minimize sway when moving a container into or out of a shelve, in a direction of arrows 562 and 564. Once the hoist mechanism 590 is raised to a desired position, the connector 610, in a form of a pivot pin 612, can be pivoted from a stowed position 614 to a lock position 616 connected with lock receptacle 618, before trolleying along arrows 562 and 564, for minimizing undesirable sway. Once a container is stored, the trolley can be moved back to a middle position above opening 474 and the pivot pin 612 can be moved back to a stowed position 614.

In another embodiment, a system for improved container logistics, including enhanced stacking, storing, inventorying and retrieving of containers, is shown in FIGS. 14 and 19. The system includes: a multi-level structure 450 including a plurality of levels 470 including a first level 472 with an opening 474 to receive a container 176 and a second level 478; a plurality of shelves 480 adjacent to the opening 474 including a port shelf 482 and a starboard shelf 484, each configured to receive a container; and a transfer mechanism 530 configured to pick a container and place it on one of the plurality of shelves 480. Advantageously, the system provides space savings and a relative small footprint, is an efficient, versatile and productive way to store, handle, inventory, densely pack and retrieve containers in proximity to where they are needed. The multi-level structure 450 has particularly adapted for use with a warehouse or assembly house.

Advantageously, the system does not require real time coordination between a system operator and truck driver, thus facilitating the process and making the operation more efficient. In various embodiments, a driver can actuate the system, drop off a container or it can be automated, once properly populated in the opening 474.

In one embodiment, monitor/sensors 456 are located in each of the plurality of shelves 180. The monitor/sensors 456 could include RF tags, imagers, proximity sensors, etc. as should be understood by those skilled in the art. This can provide real time inventory monitoring of the shelves 480. Thus, a control center would know or could see with imagers in real-time, for example, where each container in the system is located, if desired. Thus, for example, shelves can be monitored and it could be determined that a particular chassis is located in an out of service shelf and a second is located in an in service shelf. The sensors 456 can provide proper alignment in shelves information, as well as tracking and inventory monitoring. As should be understood, monitors and displays can be populated in a warehouse, at the openings of a warehouse, at a control center, etc. to monitor and/or control the method and/or structure 450.

The system can be controlled and/or monitored on site or remotely, by a control center, operator and the like, with real time inventory tracking of containers in the system. Conversely, manual operation is possible as well. An automation feature can be provided in one embodiment, which includes sensors 490, sensing proper alignment of a container in the opening, if properly aligned, actuate the system, proper interconnection of the interconnecting structure 534, connector 536 and corner castings 538 with sensors 532, etc. as best shown in FIGS. 15 and 19. The system provides enhanced container logistics, such as handling of containers, loading, unloading, temporary storage and retrieval, in connection with warehousing, hubs, assembly businesses and the like.

The system has particular application in connection with warehousing and assembly businesses that receive products often just in time, in containers. The system provides easy access for a hauler, to deliver and retrieve containers quickly and in a disciplined way.

In a preferred embodiment, the plurality of shelves 480 are complementarily configured to receive and support many conventional containers. Preferably, each shelf includes laterally extending member 494, as shown in FIGS. 15-18, to provide a complementarily configured dock or rack for receiving a container 176 securely. This construction is particularly adapted to receive containers from a side and support from a bottom, in a secure dock like fashion.

As previously detailed, the transfer mechanism 530 is configured to be lowered to a container, connected to the container, raised vertically and trolleyed horizontally to side load one of the plurality of shelves 480, providing a secure dock or rack for temporary storage and retrieval. Subsequently, fine hoisting mechanism 540 provides fine level adjustment for temporary storage and retrieval.

In a preferred embodiment, the transfer mechanism 530 includes a hoisting mechanism 590 including lateral elevation supports 592 and 594 in proximity to a bow 596 and a stern 598, the lateral elevation supports 592 and 594 include a port end 600 and a starboard end 602 configured to move vertically along and partially in a channel 604 comprised of three vertical surfaces, forming a guide or track 626. The channel 604 provides stabilization and minimal undesirable sway, during lateral trolley movement. In more detail, the channel defines a first vertical track 626 complementarily configured to receive the port 600 and the starboard ends 602. The hoisting mechanism 590 includes cables, connected to a motor 610, for raising and lowering.

The structure 450 can include imagers 454, sensors and the like being strategically located to precisely provide a real time inventory, precise location of each container in and around the structure 450 and can monitor each step in connection with the method 400. For example, strategically positioned imagers can scan the tractor ID number and take pictures of or video each container, when entering and exiting the structure 450. Advantageously, a control station can monitor and operate all activity on site or at a remote location. Advantageously, this can help to provide locations of each container in the structure 450.

As shown in FIGS. 16 and 17, a buffer mechanism 648 can be provided to receive and hold a container and allow a chassis hauled by a drive line carrier to leave, defined as a chassis-buffer handoff. Likewise, the buffer mechanism 648 can be adjusted or lowered on to a chassis, to provide a buffer-chassis handoff. The buffer mechanism 648 allows a driver and warehouse personnel to work independently. For more detail, see Lanigan, Sr. et al. U.S. Pat. No. 6,190,107. In a preferred embodiment, a plurality of stalls include a buffer, for enhanced flexibility.

The trolley 560 is configured to laterally move a container into or out of one of the plurality of shelves 470 from a side, as shown by arrows 562 and 564 in FIG. 16. This structure enhances and facilitates population and retrieval of containers in the shelves, from the side, and provides simplified access to elevated levels of shelves above the opening, both vertically and laterally. The shelves 480 provide secure docks which are at least partially complementarily configured to receive, securely dock and support many conventional containers.

In a preferred embodiment, the lane changing region or "over pass region" 520 can be configured to allow the transfer mechanism 530 to be moved from a first vertical track 526 to a different track, such as the second vertical 528 track to allow a single transfer mechanism to service multiple lanes or modules 622 and 624. This structure provides cost effectiveness, expandability and modularity.

In more detail, the over pass region 520 is configured to allow the transfer mechanism 530 to be: raised above first track 526; moved horizontally along horizontal supports 642 along a horizontal track 644; and transferred to a second vertical track 628, as shown in FIGS. 16 and 17. An overpass mechanism 646 allows the transfer mechanism 530 to move from the first module 622 to the second module 624. It can be motorized to move along the track 644, for example.

Examples of an Elevated Multi-Level Stall System

In one embodiment, an elevated stall system is located adjacent to a warehouse. Such construction and placement can provide enhanced flexibility, as detailed herein. A warehouse manager has flexibility to load or unload, at anytime, an available bay. The system can control and load or unload a desired container, to or from a chassis, by use of controls with a display, from inside a warehouse or control facility, or manually or in an automated fashion, for example.

For example, a truck line carrier delivers a container to a delivery bay. The warehouse cannot unload the container based on prior commitments, at the time of delivery. The truck line carrier delivers the container to a bay, the system lifts the container from the chassis and places it in a particular elevated stall. Then the system picks up a container from a different stall and loads it on the chassis in the bay. Once the driver receives a green light, he or she can pull away and is on the way to a desired delivery destination.

In a second example, a truck line carrier delivers a container to a warehouse, by backing into an available bay, and the container is removed from the chassis. The driver gets a green light to exit from the bay with an empty chassis. The driver next goes to a different location, picks up a container and delivers to a terminal location. Advantageously, the truck driver does not have to wait to deliver or pick up a container at the warehouse, and the warehouse is not penalized or charged a detention fee.

In a third example, a red container is delivered to bay 12. A warehouse manager has higher priorities, and programs the system to transfer the red container from a truck line carrier's chassis to stall number 3 for temporary storage. Next, a top spreader can transfer from stall number 4 (a green container, for example) to stall number 1 for unloading next to warehouse door. Next, the top spreader then transfers to stall number 2 (a blue container) and loads a container on a truck line carrier's chassis to be delivered to a port or rail terminal for final destination. Next, the spreader returns to stall number 6 (removes 53' container) and loads it in a ground stall, for eventual pick up.

Next, a tractor chassis delivers a container to bay number 9 for unloading cargo. The system unloads the container from truck line carriers' chassis, leaving bay number 9 with an empty chassis and then goes to bay number 12 ground, and loads a 53' container on truck line carrier's chassis. The chassis can then be delivered to a final destination.

Beneficially, numerous moves can be made for enhancing efficiencies of drivers and warehouse operations. The elevated warehouse stacking system can provide maximum flexibility for warehouse operations, such as in delivering and receiving containers to and from truck line carriers. The system can also relieve congestion and provide temporary or longer term storage.

This operation is advantageous for truck line carriers who own their own chassis, as it can help to provide a more efficient method and a better return on investment, by not leaving the chassis at a warehouse. The truck line carrier can deliver a container and pick up a container at the same time.

Shipping and delivery bays can alternate to relieve the truck line carriers to move a pick up or delivery. This is accomplished by storing the containers to accommodate the warehouse and truck line operation in the same group of elevated storage stalls Further benefits can include: a truck carrier being able to operate independently of ramp operations; improves drayage efficiency and productivity; truck carrier efficiency can be enhanced by dropping off a first container and picking up a second container, thus minimizing empty chassis return trips; increased warehouse capacity with multi-level storage; automated or manual operation; quicker deliveries and pick ups; a monitors facility with imagers and the like.

As should be understood by those skilled in the art, various modifications and alterations can be made without departing from the spirit and scope of this invention.

What is claimed is:

1. A method for handling containers, comprising the steps of:
    providing a multi-level structure including a plurality of levels including a first level with an opening to receive a container and a second level;
    locating a plurality of shelves adjacent to the opening including a port shelf and a starboard shelf, each shelf configured to receive a container such that a door of the container faces forward;
    providing a transfer mechanism configured to pick up a container via corner castings from a top and place it on one of the plurality of shelves, the transfer mechanism further providing a trolley configured to laterally move a container into or out of one of the plurality of shelves from a side;
    locating the multi-level structure adjacent to a warehouse such that the forward facing door faces and is adjacent with the warehouse; and
    aligning a container with a delivery bay of the warehouse such that cargo is loaded or unloaded from the container to or from the warehouse;
    the multi-level structure includes a delivery mode defined as a delivered container being delivered to the opening of the multi-level structure, lifting the delivered container from a chassis and placing it on one of the plurality of shelves via the transfer mechanism within the multi-level structure and a retrieval mode defined as picking up a container from one of the plurality of shelves and loading it on the chassis in the opening via the transfer mechanism within the multi-level structure.

2. The method of claim 1 wherein the plurality of shelves are complementarily configured to receive and support a cargo container.

3. The method of claim 1 wherein the transfer mechanism is configured to be lowered to a container, connected to the container, raised and trolleyed to side load at least one of the plurality of shelves generally horizontally with a trolley.

4. The method of claim 1 further comprising at least one of sensing alignment of the container in the opening and sensing secure interconnection between connectors of the transfer mechanism and corner castings on the container, prior to movement of the transfer mechanism.

5. The method of claim 1 wherein the transfer mechanism includes a hoisting mechanism including lateral elevation supports in proximity to a bow and a stern, the lateral elevation supports including a port end and a starboard end configured to move vertically along and partially in a channel.

6. The method of claim 1 wherein the trolley includes a longitudinal support including rollers connected to lateral elevation supports having an opening defining a channel of a hoisting mechanism, the trolley configured to move generally horizontally via the rollers along the channel.

7. The method of claim 1 further comprising providing a lane changing region for the transfer mechanism.

8. The method of claim 1 further comprising transferring the transfer mechanism from a first vertical track to a second vertical track.

9. The method of claim 1 wherein the multi-level structure further includes providing a plurality of vertical supports with channels configured to partially receive a port end and a starboard end of lateral elevation supports of a hoisting mechanism.

10. The method of claim 1 wherein the transfer mechanism includes a hoisting mechanism including connectors for connecting and disconnecting with the corner castings.

11. The method of claim 1 wherein the transfer mechanism includes a fine hoisting mechanism for fine raising or lowering the container on one of the plurality of shelves.

12. A system for storing containers, comprising:
    a multi-level structure including a plurality of levels including a first level with an opening to receive a container and a second level:
    the multi-level structure including four vertical supports and a plurality of shelves adjacent to the opening including a port shelf and a starboard shelf, each shelf extending inwardly of the four vertical supports and being configured to receive a container such that a door of the container faces forward and is within the multi-level structure;
    a transfer mechanism configured to pick up a container and place it on one of the plurality of shelves, wherein a bow of the multi-level structure is configured to be adjacent to a warehouse such that the forward facing door faces and is adjacent with the warehouse and the container is aligned with a delivery bay of the warehouse such that cargo is loaded or unloaded from the container;
    the transfer mechanism includes a trolley configured to laterally move a container into or out of one of the plurality of shelves from a side within the multi-level structure;
    the trolley includes a longitudinal support including rollers connected to lateral elevation supports having an opening defining a channel of a hoisting mechanism, the trolley configured to move horizontally within the multi-level structure;

the multi-level structure is located adjacent to and in alignment with a delivery bay of a warehouse such that cargo is loadable or unloadable from the container to or from the warehouse;

the multi-level structure includes a delivery mode defined as a delivered container being delivered to the opening of the multi-level structure, lifting the delivered container from a chassis and placing it on one of the plurality of shelves within the multi-level structure and a retrieval mode defined as picking up a container from one of the plurality of shelves within the multi-level structure and loading it on the chassis in the opening.

13. The system of claim 12 wherein the plurality of shelves are complementarily configured to receive and support a cargo container.

14. The system of claim 12 wherein the transfer mechanism is configured to be lowered to a container, connected to the container, raised vertically and trolleyed horizontally to side load at least one of the plurality of shelves.

15. The system of claim 12 wherein the transfer mechanism includes a hoisting mechanism including lateral elevation supports in proximity to a bow and a stern, the lateral elevation supports including a port end and a starboard end configured to move vertically along and partially in a channel.

16. system of claim 12 further comprising a lane changing region configured to allow the transfer mechanism to be moved from a first vertical track to a second vertical track.

17. The system of claim 12 wherein the multi-level structure is configured with a lane changing region that allows the transfer mechanism to pass between a first and a second lane via the lane changing region.

18. The system of claim 12 wherein the transfer mechanism includes a hoisting mechanism including connectors for connecting and disconnecting with corner castings on containers.

* * * * *